United States Patent Office 3,655,864
Patented Apr. 11, 1972

3,655,864
GLYCERYL TRISTERATE AND HIGHER FATTY ACID MIXTURE FOR IMPROVING DIGESTIVE ABSORPTION
George M. Grass, Jr., Phoenixville, and Raymond R. Unangst, Havertown, Pa., assignors to Smith Kline & French Laboratories, Philadelphia, Pa.
No Drawing. Filed Sept. 21, 1970, Ser. No. 74,138
Int. Cl. A61k 27/00
U.S. Cl. 424—38                   7 Claims

ABSTRACT OF THE DISCLOSURE

Veterinary compositions permitting passage of biologically active feed additives through the rumen substantially unchanged resulting in release and absorption postruminally. The compositions are embedded in or coated by an intimate mixture of glyceryl tristearate with a liquid unsaturated higher fatty acid. A preferred composition is the feed additive in association with glyceryl tristearate and oleic acid.

---

This invention relates to biologically active feed additives for ruminants having a coating or a matrix resistant to the rumen contents. More specifically, this invention relates to biologically active components of animal feeds such as antibiotics, vitamins and nutrients which have a coating or a matrix material resistant to the rumen contents but capable of permitting absorption from the lower digestive tract postruminally.

It is well known in the veterinary field that biologically active feed additives are effective when absorbed from the loyer digestive tract. Ruminants such as cattle and sheep form a special class of animal because of their digestive system. Microorganisms of various populations inhabit the digestive tract of most animals. However, the ruminant particularly has an abundant microbial population in the forestomach or rumen. Many types of chemical reactions are characteristic of microbial fermentation in the rumen. Proteins entering the rumen are subjected to extensive hydrolysis and the amino acids undergo rapid deamination. Thus, many biologically active compounds that enter the rumen as supplemental additions to the diet are destroyed or rendered unavailable by the microorganisms present. This fermentation process in the rumen causes the dietary administration of many substances such as antibiotics, vitamins and nutrients to be ineffective. Evidence suggests that this may be of considerable significance in protein nutrition of ruminants. It is known that dietary supplementation of amino acids has little influence on the quantities of these compounds that are available for absorption. However, postruminal administration of amino acids such as methionine does increase nitrogen balance and markedly affect plasma levels which could lead to an increase in feed efficiency. In brief, amino acids which are subject to microbial fermentation are destroyed in the rumen and only when the rumen is bypassed does the quantity of these amino acids available for absorption increase.

It is therefore the object of this invention to provide a coating or matrix for biologically active feed additives that will resist microbial destruction in the rumen thereby permitting absorption of the biological additives from the lower digestive tract making them available for utilization by the animal upon oral administration.

It is a further object of this invention to provide a method of increasing the feed efficiency of ruminants by administering orally to the animal a feed supplement coated as to render it resistant to attack within the rumen of the animal and at the same time absorbable from the lower digestive tract.

The novel coating or matrix composition of this invention comprises an intimate mixture of glyceryl tristearate with a monocarboxylic higher liquid unsaturated fatty acid having from 16 to 22 carbons such as oleic, linoleic, linolenic, petroselenic, or palmitoleic as well as unsaturated natural or partially processed oils such as, for example, soybean oil or corn oil which contain mixtures of such fatty acids.

Glyceryl esters such as glyceryl tristearate are well known in the pharamceutical art as protective coating materials. Further, glyceryl tristearate has been employed in the veterinary field to coat biologically active materials for feeding ruminants. The major disadvantage of using glyceryl tristearate by itself is that although it does protect the material in the rumen, it also prevents release and absorption of the active material in the lower digestive tract. The biologically active material is so well protected that a greater percentage of it passes through both the rumen and lower digestive tract of the animal without being released or absorbed.

It has been unexpectedly discovered that the combination of glyceryl tristearate with a liquid unsaturated fatty acid or oil as hereinbefore described provides a coating composition or matrix that not only protects biologically active feed additives in the rumen but also permits release and absorption of the biological active material in the lower digestive tract.

If the glyceryl tristearate is used alone as the coating agent, the active ingredient is not satisfactorily released in the lower digestive tract. For example, the effct of coating the amino acid, methionine with a composition containing the combination of glyceryl tristearate and oleic acid was compared to a coating of glyceryl tristearate alone. Methionine was coated with both compositions and tested in vivo for both release and actual absorption in ruminants. The study was designed to observe the amount of methionine released in the rumen and lower digestive tract and is demonstrated by the following in vivo experiments.

The evaluation of the coated methionine was achieved by the nylon bag technique. The method involves placing samples of the material to be tested in a fine mesh nylon bag and incubating the bags in the rumen of cattle for a period of time. After the incubation the effectiveness of the coating to protect the active ingredient is determined by analyzing the amount of methionine recovered in the nylon bag. Similar samples are then placed in the lower digestive tract of the animal to evaluate how effectively the coating releases methionine for absorption.

Details of the two procedures are as follows:

(A) Triplicate samples of the coated methionine to be tested are prepared by weighing 250 mg. on a two inch square piece of fine mesh nylon fabric. The sample is identified by adding an inert numbered marker and a bag is formed and closed with a purse string tie. The individual bags are placed in a larger bag made of the same nylon mesh. The larger bag is fixed with inert weights and a retrieval cord so it can be suspended and will remain in the ventral portion of the rumen. The larger bag containing the samples is inserted into the rumen through a rumen cannula. The samples are retrieved after 17 hours and gently washed with cool water. A quantitative chemical analysis is then conducted on the material recovered from each nylon bag. The data is expressed as "percent recovered."

(B) Quadruplicate samples of coated methionine are prepared in nylon bags as outlined above except 100 mg. is used instead of 250 mg. The small individual bags containing the sample are then inserted into the abomasum via an abomasal cannula. The bags are free flowing and therefore pass through the lower digestive tract with the ingesta and are subsequently recovered from the feces.

The time required for the bags to be eliminated from the animal is usually 17 to 20 hours. A quantitative analysis is performed on the material recovered from the nylon bags and the data expressed as "percent released."

Following are results obtained with methionine using the designated coating compositions prepared.

TABLE I

| Formulation | | Percent | Percent recovered from rumen | Percent released, lower digestive tract |
|---|---|---|---|---|
| 1 | Methionine | 20 | 77 | 31 |
|   | Glyceryl tristearate | 80 | | |
| 2 | Methionine | 20 | 89 | 92 |
|   | Oleic acid | 15 | | |
|   | Calcium carbonate | 10 | | |
|   | Glyceryl tristearate | 55 | | |
| 3 | Methionine | 20 | 80 | 90 |
|   | Oleic acid | 20 | | |
|   | Glyceryl tristearate | 50 | | |
|   | Calcium carbonate | 10 | | |
| 4 | Calcium carbonate | 10 | 87 | 45 |
|   | Glyceryl tristearate | 70 | | |
|   | Methionine | 20 | | |
| 5 | Methionine | 20 | 87 | 73 |
|   | Corn oil | 15 | | |
|   | Calcium carbonate | 10 | | |
|   | Glyceryl tristearate | 55 | | |
| 6 | Methionine | 20 | 61 | 49 |
|   | Caster oil | 15 | | |
|   | Calcium carbonate | 10 | | |
|   | Glyceryl tristearate | 55 | | |

It is desirable in the practice of this invention to have the coating material protect approximately 80% of the biologically active substance in the rumen and have it pass to the lower digestive tract for release and absorption. The protection in the rumen should be for a period of from about 10 to 20 hours.

The above results indicate that although glyceryl tristearate alone does give reasonable protection in the rumen, it also dramatically slows down release and absorption of the methionine from the lower digestive tract. When oleic acid is added to the formula, the methionine is not only protected adequately in the rumen but released much faster in the lower digestive tract, i.e., an increase of from 31% to 92% in lower tract release.

Further, the above results also indicate when a saturated oil, i.e., castor oil, is mixed with glyceryl tristearate, the methionine is both very poorly protected in the rumen and poorly released in the lower digestive tract. When unsaturated corn oil is employed, protection in the rumen and good release in the lower digestive tract is also achieved.

The above release rates were confirmed by conducting further experiments to determine the methionine plasma levels in lambs. Two experiments were carried out using growing lambs weighing approximately 35 kg. to study the availability of methionine as measured by plasma methionine levels comparing coating materials containing glyceryl tristearate alone and in combination with oleic acid, as represented by formulations 1 and 2 in the above Table 1.

In the first experiment, 40 gms. per day of formulation 1 was mixed with the feed and administered orally to the lambs. The following results were obtained:

Plasma methionine concentrations

Treatment: Plasma methionine, $\mu$g./ml.
  Control—Normal animal _____ 3.67
  40 gm. of formulation 1 (glyceryl tristearate alone) per day per lamb _____ 5.69

The above data indicates very little available methionine as measured by plasma concentration technique when the methionine is coated by glyceryl tristearate alone.

The experiment was repeated using formulation 2 which has oleic acid added to the coating composition. The following results were obtained:

Treatment: Plasma methionine, $\mu$g./ml.
  Control—Normal animal _____ 5.33
  40 gm. of formulation 2 (glyceryl tristearate+ oleic acid) per day per lamb _____ 22.66

This data indicates a considerable increase in plasma methionine response when oleic acid is added to the coating composition confirming the release rate obtained by the above described nylon bag technique.

It has therefore been unexpectedly discovered that the coating compositions of this invention go a considerable way to solving the long standing problem of poor release in the lower digestive tract when employing glyceryl tristearate alone as a coating agent for protecting biologically active substances administered orally to ruminants.

The coating compositions in accordance with this invention comprise a combination of glyceryl tristearate with either an unsaturated liquid monocarboxylic higher fatty acid having from 16 to 22 carbon atoms or an unsaturated natural oil containing similar fatty acids. The fatty acids may be, for example, oleic, linoleic, linolenic, petroselenic, palmitoleic. Some examples of unsaturated natural preferably vegetable oils are soy bean oil, corn oil, cottonseed oil, peanut oil, and olive oil. Of course, as any fat chemist will recognize mixtures of oils and unsaturated fatty acids may be equivalently used.

Preferably the coating compositions of this invention will contain glyceryl tristearate in combination with the unsaturated higher fatty acids. Most advantageously the coating composition of this invention will contain glyceryl tristearate in combination with oleic acid.

The unsaturated higher fatty acids or unsaturated vegetable oils will be present in relation to the glyceryl tristearate in an amount of from about 5% to about 35%. Preferably the fatty acids or oils will be present in an amount of from about 10% to about 20% relative to the glyceryl tristearate.

The percent of glyceryl tristearate relative to the fatty acids or natural oils will be from about 65% to 95%. Preferably the glyceryl tristearate will be present in an amount of from about 70% to about 80%.

The ratio of the higher unsaturated fatty acids or vegetable oils to the glyceryl tristearate will be approximately from 1:2 to 1:19.

Since the residence time of feed particles in the rumen of animals is reported to be from about 10 to 20 hours, density agents may be added to the formulation to insure passage of the particles to the lower digestive tract, where they should be absorbed for beneficial effect. The density of the coated material should be such as to insure that the material does not remain floating in the rumen for a prolonged period of time. If agents are necessary to regulate the density, compounds employed may be, for example, calcium carbonate, kaolin, powdered iron, or calcium sulfate.

This invention is applicable to any desired biologically active feed additive compounds. By way of example, the biologically active compounds may be an amino acid such as, for example, methionine or lysine; an antibiotic, such as, for example, penicillin, tetracycline, chloramphenicol; a sulfonamide such as, for example, sulfamethazine or sulfathiazine; a tranquilizer such as, for example, chlorpromazine, prochlorperazine, or trifl009perazine; a sedative such as, for example, phenobarbital or amytal; vitamin such as, for example, Vitamin A and Vitamin D or vitamin combinations; anthelmintics such as, for example, piperazine phosphate; hormone growth supplements such as, for example, stilbesterol and many more medicaments such as growth promoting agents and those used in the treatment of bacterial enteritis such as furazolidone.

Methods well known to the pharmaceutical art may be employed to coat or embed the biologically active compounds in a matrix of the novel composition of this invention. The active ingredients may be embedded in the glyceryl tristearate mixture by methods such as spray congealing or extrusion. Typical coating procedures would be, for example, coating the powdered ingredients directly by air suspension techniques such as described in U.S. Pat. No. 3,237,596 or forming granules of the compounds and pan coating the granules.

When a high percentage of the active compound is desired, overcoating of the spray congealed pellets or coated granules may be necessary. Following are some specific examples of the processes described above.

Embedding in matrix by spray congealing

Ingredients: Amounts, gms.
  Methionine _____ 200
  Oleic acid _____ 150
  Calcium carbonate _____ 100
  Glyceryl tristearate _____ 550

The glyceryl tristearate is melted and the temperature raised to 80° C. The oleic acid, methionine and calcium carbonate are added with rapid and thorough agitation to this matrix. The composition is mixed to a smooth slurry and the temperature is adjusted to 80° C. for spray congealing.

The spray congealing is accomplished in a conventional type spray dryer with the temperature at 25° C. A ⅛" GG316-2 Spraying Systems Fulljet type pressure nozzle having an angle of 50° with an orifice diameter of 0.047" is used. The spraying pressure is adjusted to 140 pounds per square inch and the spray atomized material is sprayed upwardly and allowed to fall 25 feet to a container at the bottom of the dryer.

The resultant product is spherical pellets ranging in size of from about 200 microns to about 2000 microns.

A more detailed description of carrying out the spray congealing process described above could be found in U.S. Pat. No. 3,146,167.

Granulating and pan coating

Ingredients: Amounts, gms.
  Tetracycline hydrochloride _____ 600
  10% gelatin solution _____ —
  Oleic acid _____ 90
  Glyceryl tristearate _____ 231

The 10% gelatin solution is added to the tetracycline to form a granulation. The granulation is dried overnight at about 120° F. The resulting material is milled in a comminuting machine and passed through a #16 U. S. Standard Mesh Sieve. The resulting granules are placed in a coating pan and sprayed with an alcoholic chloroform solution of the glyceryl tristearate and oleic acid. The coated granules are then dried overnight at room temperature.

Embedding in matrix by extrusion

Ingredients: Amounts, gms.
  Lysine _____ 200
  Oleic acid _____ 150
  Kaolin _____ 100
  Glyceryl tristearate _____ 550

The glyceryl tristearate is melted. The oleic acid, lysine and kaolin are added with rapid and thorough agitation. The mixture is allowed to cool to a plastic state. The mixture is then run through an appropriate extruder. The finished product is in the form of pellets.

The above coated biologically active ingredients can be incorporated into feed or feed premix compositions in effective but nontoxic quantities which increase feed efficiency or have a therapeutic effect. The compositions are then fed to ruminant animals as usual in the agricultural art.

The animal feeds themselves may also contain cellulosic roughage such as cellulose, hay, straw, corn stalks, cotton seed hulls, oats, barley and cereal brans, natural oils, such as, for example, animal fats, fish oils, safflower oil, peanut oil and cottonseed oil, antioxidants, minerals, vitamins, antibiotics, anthelmintics and other appropriate medicaments.

A typical prepared animal feed is as follows:

Mixed hay—40.0%
Ground yellow corn—45.0%
Soybean oil meal—7.0%
Cane molasses—7.0%
Dicalcium phosphate—0.5%
Trace minerals salt—.5%
Vitamin A—300 I.U./lb.
Vitamin D—150 I.U./lb.
Coated methionine—20 lbs./ton of feed Similar animal feeds may be prepared using an equivalent amount of the other above noted coated biologically active compounds.

The method of this invention comprises allowing the ruminants to graze or be fed ad libitum on the supplemented rations.

What is claimed is:

1. A veterinary composition to be administered orally to ruminants which permits the passage of biologically active compounds through the rumen substantially unchanged and results in the release and absorption of said compounds in the lower digestive tract comprising the biologically active compound embedded in or coated by an intimate mixture of glyceryl tristearate with a liquid unsaturated higher fatty acid having from 16 to 22 carbon atoms, the ratio of the fatty acid to the tristearate being from about 1:2 to 1:19, and when the compound is embedded in the mixture said composition contains a density agent in the mixture to insure more rapid passage of the compound through the rumen to the lower digestive tract.

2. The composition of claim 1 in which the fatty acid is oleic. linoleic, or linolenic acid.

3. The composition of claim 1 in which the fatty acid is oleic acid.

4. The composition of claim 1 in which the biologically active compound is methionine.

5. A method for improving the feed efficiency of ruminants comprising administering orally to said ruminants a composition according to claim 1.

6. The method of claim 5 in which the fatty acid is oleic acid.

7. The method of claim 5 in which the feed additive is methionine.

References Cited

UNITED STATES PATENTS 3,584,114   6/1971   Cavalli _____ 424—38

SAM ROSEN, Primary Examiner

U. S. Cl. X.R.

424—318, 319, 365